(12) United States Patent
Bal et al.

(10) Patent No.: US 11,629,011 B2
(45) Date of Patent: Apr. 18, 2023

(54) CHAIN LINK AND CONVEYOR CHAIN COMPRISING CHAIN LINKS, BLANK FOR A CHAIN LINK AND METHOD OF MANUFACTURING A BLANK FOR A CHAIN LINK

(71) Applicant: REXNORD FLATTOP EUROPE B.V., 's-Gravenzande (NL)

(72) Inventors: Franciscus Maria Bal, Vlaardingen (NL); Cornelis Hendrik Mijndert Menke, The Hague (NL)

(73) Assignee: REXNORD FLATTOP EUROPE B.V., S-Gravenzande (NL)

( * ) Notice: Subject to any disclaimer, the term of this patent is extended or adjusted under 35 U.S.C. 154(b) by 0 days.

(21) Appl. No.: 17/420,472

(22) PCT Filed: Jan. 10, 2020

(86) PCT No.: PCT/NL2020/050013
§ 371 (c)(1),
(2) Date: Jul. 2, 2021

(87) PCT Pub. No.: WO2020/145824
PCT Pub. Date: Jul. 16, 2020

(65) Prior Publication Data
US 2022/0144552 A1    May 12, 2022

(30) Foreign Application Priority Data

Jan. 10, 2019   (NL) ..................... 2022373

(51) Int. Cl.
*B65G 17/40*   (2006.01)
*B65G 17/08*   (2006.01)
(Continued)

(52) U.S. Cl.
CPC ............ *B65G 17/40* (2013.01); *B21D 28/06* (2013.01); *B21L 9/04* (2013.01); *B21L 11/10* (2013.01)

(58) Field of Classification Search
None
See application file for complete search history.

(56) References Cited

U.S. PATENT DOCUMENTS 2,402,376 A    6/1946   Dalrymple
2,579,410 A    12/1951  Zanitis
(Continued)

FOREIGN PATENT DOCUMENTS

DE           893025 C      10/1953
DE          3324252 A1      5/1985
WO       2015088336 A1      6/2015

OTHER PUBLICATIONS

PCT International Search Report and Written Opinion, PCT/NL2020/050013, dated Mar. 25, 2020, 20 pages.

*Primary Examiner* — Kavel Singh
(74) *Attorney, Agent, or Firm* — Quarles & Brady LLP

(57) ABSTRACT

A chain link for a conveyor chain includes a planar elongate sheet metal conveying body having four outer corners and sides that extend between adjacent outer corners, the sides include long sides and short sides that extend between the long sides, the sides further include side face portions that extend substantially transversely to a conveying plane of the conveying body, and at each of the outer corners, the conveying body may include a corner face portion that extends transversely to the conveying plane and that connects angularly to a side face portion of a short side.

27 Claims, 6 Drawing Sheets

(51) Int. Cl.
    *B65G 17/32*     (2006.01)
    *B21D 28/06*     (2006.01)
    *B21L 9/04*     (2006.01)
    *B21L 11/10*     (2006.01)

(56) References Cited

U.S. PATENT DOCUMENTS

| | | | | |
|---|---|---|---|---|
| 3,529,715 | A * | 9/1970 | Mueller | B65G 17/086 |
| | | | | 198/852 |
| 3,706,200 | A * | 12/1972 | Mueller | B65G 17/08 |
| | | | | 59/91 |
| 3,785,236 | A | 1/1974 | Peterson | |
| 4,074,518 | A * | 2/1978 | Taubert | B21L 11/00 |
| | | | | 59/91 |
| 4,344,342 | A | 8/1982 | Garvin | |
| 9,290,327 | B2 * | 3/2016 | Abbestam | B65G 17/086 |
| 9,340,359 | B2 * | 5/2016 | Bettati | B65G 15/32 |
| 10,183,808 | B2 * | 1/2019 | Menke | B65G 17/08 |
| 10,427,881 | B2 * | 10/2019 | Menke | B65G 17/08 |
| 2018/0231103 | A1 | 8/2018 | Urbanek | |

* cited by examiner

CHAIN LINK AND CONVEYOR CHAIN COMPRISING CHAIN LINKS, BLANK FOR A CHAIN LINK AND METHOD OF MANUFACTURING A BLANK FOR A CHAIN LINK

CROSS-REFERENCE TO RELATED APPLICATIONS

This application represents the national stage entry of PCT International Application No. PCT/NL2020/050013 filed on Jan. 10, 2020, which claims priority to Netherlands Patent Application NL 2022373 filed on Jan. 10, 2019, each of these applications is hereby incorporated herein by reference for all purposes.

The invention relates to a link for a conveyor chain, comprising a conveying body of sheet metal, and a conveyor chain comprising such links. The invention also relates to a blank for a chain link and method of manufacturing a blank for a chain link.

Conveyor chains with sheet metal chain links are generally known, and are e.g. used for conveying glass bottles.

As shown in Prior art FIGS. 1a and 1b, the chain links 1 in these conveyor chains 2 typically comprises a planar elongate sheet metal conveying body 3 having four outer corners 4 and sides that extend between adjacent outer corners, the sides including a pair of opposing long sides 5, and a pair of opposing short sides 6 that extend between the long sides 5. The sides include side face portions 7 that extend substantially transversely to a conveying plane 9 of the conveying body 3. At each of the outer corners 4, the conveying body 3 includes a corner face portion 8 that extends transversely to the conveying plane 9, and that is rounded to connect tangentially to both a side face portion 7a of a long side 5 and a side face portion 7b of a short side 6. This way, the conveying body 3 is provided with a periphery in which at the four outer corners 4, the side faces 7 connect via a smooth connection path.

The chain link 1 typically has a centrally located coupling piece 10 on one long side 5 thereof and a pair of interspaced coupling pieces 11 on the opposite long side 5' thereof. The coupling pieces 10, 11 are arranged such that the centrally located coupling piece 10 on one long side 5 of the conveying body 3 corresponds with the interspace 12 between the interspaced coupling pieces 11 on the opposite longitudinal 5' side of the conveying body 3. A pair of receiving spaces 12A, 12B then may be provided adjacent the centrally located coupling piece on the one long side 5 of the conveying body that correspond to the interspaced coupling pieces 11 on the opposite long side 5' of conveying body The coupling pieces 10, 11 extend from the conveying body 3 to loop around a receiving space 13 for a hinge pin 14 located below the conveying plane 9 of the conveying body 3. Additional coupling pieces and corresponding interspaces may be present, e.g. in a so called double hinge chain link. The conveyor chain 2 includes a series of chain links 1 in which the centrally located coupling piece 10 of one link 1 is received in the interspace 12 between the interspaced coupling pieces 11 of a consecutive link 1. The centrally located 10 coupling piece and the interspaced coupling pieces 11 of consecutive links 1 cooperate to form a hinge, and are connected by means of a hinge pin 14 extending through the receiving space 13. In a conveyor chain 2, the receiving spaces 12A,12B may then each accommodate one of the pair of coupling pieces 11 of an adjacent chain link on one long side 5 of the conveying body, and the interspace 12 may then accommodate the centrally located coupling piece 10 of another adjacent chain link on the opposite long side 5' of the conveying body. In use in a conveyor 2, one long side 5 of the elongate conveying body 3 of the link 1 forms a leading edge of the link 1 in a conveying direction P, and the opposite long side 5' forms a trailing edge of the link 1, while the short sides 6 of the conveying body 3 form lateral edges of the link 1.

This type of chain link has been standardized in DIN 8153/ISO 4348. The DIN 8153/ISO 4348 standardization schematically depicts the chain link, and determines the sizes and dimensions of so called flat-top chain links, e.g. the pitch between chain links, the hinge pin diameter and e.g. how the coupling pieces of the chain links need to be curled so as to ensure uniformity and interconnectivity of the chain links.

As shown in Prior art FIG. 2, the chain links are manufactured by punching chain link blanks 16 from a flat strip 17 of sheet metal, resulting in a base form for a chain link. The blanks 16 comprise a planar elongate sheet metal conveying body 3 configured as discussed above, having four outer corners 4 and sides that extend between adjacent outer corners, the sides including a pair of opposing long sides 5, and a pair of opposing short sides 6 that extend between the long sides 5. The sides include side face portions 7 that extend substantially transversely to a conveying plane 9 of the conveying body 3. At each of the outer corners 4, the conveying body 3 includes a corner face portion 8 that extends transversely to the conveying plane 9, and that is rounded to connect tangentially to both a side face portion 7a of a long side 5 and a side face portion 7b of a short side 6. This way, the conveying body 3 is provided with a periphery in which at the four outer corners 4, the side faces 7 connect via a smooth connection path.

The blanks 16 further comprise planar tongues 18 extending from long sides 5 of the conveying body 3 along a conveying plane 9 of the body. One tongue 18 is centrally located on one long side 5 of the elongate conveying body 3 and two interspaced tongues 18 are placed on an opposite long 5' side. The tongues 18 are arranged such that the centrally located tongue 18 on one long side of the conveying body 3 corresponds with the interspace 12 between the interspaced tongues 18 on the opposite long side 5' of the conveying body 3. When forming the blanks 18 into chain links 1, the tongues 18 are curled to form coupling pieces 10,11 also known as 'hinge eyes'. The centrally located coupling piece 10 of one long side 5 of a chain link 1 is received in the interspace 12 between the interspaced coupling pieces 11 on a long side 5' of a consecutive link 1.

In the prior art stamping process, a punch tool of which the contour conforms with the contour of the blank 16 stamps the sheet metal of the strip 17 through a die, and punches out the blank 16. A clamping zone is provided in the sheet metal surrounding the periphery of the blank, including the periphery at the outer corners 4. The dimension of the clamping zone varies, but is at least 1.5-3 mm as measured perpendicular from the periphery in the plane of the strip. During punching, the sheet metal surrounding the punch tool is clamped at the clamping zone of the strip 17, as to be able to punch out a blank 16 shaped corresponding to the punch tool with its rounded corner face portions in its peripheral edge.

In the blank 16, the side face portions 7a of the long sides 5 and side face portions 7b of the short sides 6 of the conveying body 3 connect tangentially via rounded connections. This way, the contour of the conveying body of the blank is provided with a peripheral edge in which at the four outer corners 4, the side edge portions connect via a smooth connection path. As a result, a hole is left in the strip 17 of sheet metal of which the shape matches the blank 16.

The strips of sheet metal of a desired width W are obtained from a wider coil of steel sheeting in so called slitting process. In the steel slitting process, rotating male and female circular knives engage to provide a scissor cutting effect. The strips of sheet metal include longitudinal edges 19 that present a slit structure 19' (Prior art FIG. 7). The slit structure 19' is generally symmetrical top to bottom, and presents shiny zones 31 at the top and the bottom of its height (transverse to the conveying plane) where the knives engage the sheet metal, and a dull fracture zone 32 therebetween where the sheet metal is fractured.

Due to the stamping process, the sheet metal conveying body 3 of the blank 16 and that of the resulting chain link 1 has a peripheral edge with a contour that comprises stamped side face portions 33 both at the long sides 5 and at the short sides 6. These stamped side face portions 33 present a stamped structure 33' (Prior art FIG. 8). Such stamped structure 33' at the stamped side face portion 33 of the blank is generally asymmetrical top to bottom, and includes a shiny zone 31 where the punch started to engage the sheet metal, followed by a dull fracture zone 32. The shiny zone 31 is typically smaller in height (transverse to the conveying plane) and located at a bottom of the side face, and the dull fracture zone 32 is typically larger and is located at a top of the side face 7, e.g. a side near the conveying plane of 9 the conveying body 3.

After stamping the blank 16 from the strip 17, and conveniently before curling the tongues 18 into coupling pieces, the top peripheral edge of the conveying body 3 of the blank 16 is rounded in a coining process so as to provide a smooth transition between the peripheral side face 7 and a flat planar transport surface 21 of the conveying body 3 that is located in the conveying plane 9. As shown in Prior art FIGS. 1a and 1b, this way, a coined top section 22 is provided that forms a smooth transition between a peripheral boundary of the flat planar transport surface 21 and the side face portions 7 and the rounded corner face portions 8 of the peripheral edge of the conveying body 3. The coined top section 22 defines a boundary line 23 of the flat planar transport surface 21. At the four outer corners 4, the boundary line 23 is rounded, and follows the connection path of the rounded corner face portions 8 of the conveying body.

Approximately 75-80% of the production costs of a sheet metal chain link can be related to material cost, and saving material thus has a big impact on reducing the total production cost of a sheet metal chain link. To minimize sheet metal losses during punching of chain link blanks, as shown in Prior art FIG. 2 the consecutive chain link blanks 16 are punched from the strip 17 of sheet metal in a nesting pattern where the centrally located tongue 18 will fit in between the two interspaced tongues 18 of a consecutive blank to be punched.

Saving material has been an area of focus for the industry for a long time, and e.g. in WO 2015/088336 in the name of applicant it has been proposed to reduce curling the coupling pieces to less than ¾ loop, so as to save material costs by shortening the length of the tongues.

Also, to save material, the width W of a strip of sheet metal is typically chosen so that several blanks for the chain link may be punched side by side from the strip, so that the adjacent blanks can share a clamping zone. Nevertheless, Prior art FIG. 2 shows that there are still significant material losses; only the hatched areas of the blanks 16 in a row is effectively used.

An object of the invention therefore is to provide a modular conveyor chain that mitigates the above mentioned material losses still further.

Thereto, the invention provides for a chain link for a conveyor chain, comprising a planar elongate sheet metal conveying body having four outer corners and sides that extend between adjacent outer corners, the sides including a pair of opposing long sides, and a pair of opposing short sides that extend between the long sides, the sides further including side face portions that extend substantially transversely to a conveying plane of the conveying body, and wherein at each of the outer corners, the conveying body includes a corner face portion that extends transversely to the conveying plane, and that connects angularly to a side face portion of a short side. By allowing the corner face portion to connect at an angle to the side face portion, the need for a clamping zone in the sheet of metal along the short side of the blank may be dispensed with. During punching, the punch tool may overlap the longitudinal side face of the strip of sheet metal to form a corner face portion that connects at an angle with the longitudinal edge of the strip. An angle of connection between the side face portion and the corner face portion measured over the conveying body may e.g. be between 175° and 90°, in particular between 150° and 100°, and may in particular be about 120°. An angle of intersection between the tangent to the side face portion and the tangent to the corner face portion measured along the conveying body may e.g. be between 5° and 90°, in particular between 30° and 80°, and may in particular be about 60°. The corner face portion may include a sharp-cornered connection to the side face portion of the short and/or long side. The corner face portion may further connect to the side face portion via a flat planar connection face, and may thus form a straight connection instead of a curved connection as in the prior art. Due to the angled and/or sharp-cornered connection of the corner face portion, the peripheral side edge may include a kinked and/or sharp-cornered, in particular angular, transition instead of a smooth, rounded transition at one or more of the outer corners.

Within the context of this patent specification, the term 'connects angularly' is to be construed as a connection that is angular compared to a rounded connection. The corner face portion that connects angularly to the side face portion of the short side may thus be sharp-cornered, in particular angular, compared to a smooth, rounded connection of, as a matter of reference, conventional chain links of the type standardized in DIN 8153/ISO 4348. These expressions in this context are understood to be comprised within the definition of the term 'connects angularly'. Such a rounded connection may in particular be rounded to connect tangentially to both a side face portion of a long side and a side face portion of a short side. Such rounded connection may in the context of this application then in particular be considered as side faces connecting via a smooth connection path.

The longitudinal side face of the strip may form a short side of the conveying body of the blank and thus of the link. This way, the width of the strip of sheet metal may correspond to the nett width of one blank to be punched, or several blanks to be punched side by side from the strip, and scrap may be reduced significantly.

A blank or chain link in accordance with the invention may include a sheet metal conveying body having a peripheral edge with a contour that comprises one or more stamped side face portions presenting a stamped structure, as well as at least one slit side face portion presenting a slit structure. In particular, a chain link or blank in accordance with the invention may alternatively or additionally be defined as including a planar elongate sheet metal conveying body having four outer corners and sides that extend between adjacent outer corners, the sides including a pair of opposing long sides, and a pair of opposing short sides that extend between the long sides, the sides further including side face portions that extend substantially transversely to a conveying plane of the conveying body, wherein one of the sides, in particular a long side, includes a stamped side face portion presenting a stamped structure, and wherein at least one of the other sides, in particular a short side includes a slit side face portion presenting a slit structure.

The conveying plane of the conveying body may include a flat planar transport surface that in use is in contact with products to be conveyed, and on which the products may be supported stably. The conveying plane may be bounded by a coined top section of the peripheral edge of the conveying body that forms a smooth transition between a peripheral boundary of the flat planar transport surface and the side face portions and corner face portions of the peripheral edge of the conveying body. The coined peripheral edge of the conveying body may prevent products or other objects from getting caught when the conveying planes of individual adjacent links are not fully flush. Elegantly, the coined top section defines a peripheral boundary line of the flat planar transport surface. At a corner face portion that connects angularly to a side face portion of a short side, the coined top section defines line portions of the peripheral boundary line that connect tangentially via a rounded connection. This way, the flat planar transport surface may be shaped exactly as in the prior art, while at the outer corners the peripheral side edge may include a sharp, kinked transition instead of a smooth, rounded transition at one or more of the outer corners to allow for manufacture with significantly increased material efficiency.

The conveying body may have a centrally located coupling piece on one long side thereof and a pair of coupling pieces on the opposite long side thereof, and wherein the coupling pieces are arranged such that the centrally located coupling piece on one long side of the conveying body corresponds with the interspace between the interspaced coupling pieces on the opposite long side of the conveying body, and the coupling pieces may extend from the conveying body to loop around a receiving space for a hinge pin located below the conveying plane of the conveying body. A pair of receiving spaces then may be provided adjacent the centrally located coupling piece on the one long side of the conveying body that correspond to the interspaced coupling pieces on the opposite long side of conveying body. In a chain, the receiving spaces may then each accommodate one of the pair of coupling pieces of an adjacent chain link on one long side of the conveying body, and the interspace may then accommodate the centrally located coupling piece of another adjacent chain link on the opposite long side of the conveying body. Such arrangement may have a total of three coupling pieces to form a single hinge configuration.

The conveying body may further additionally comprise a further pair of coupling pieces on either side of the centrally located coupling piece on the one long side of the conveying body, each adjacent to a receiving space. A pair of further receiving spaces may then be provided on the opposite long side of the conveying body that correspond to the pair of further coupling pieces on the one long side of the conveying body, each adjacent to one of the pair of coupling pieces. In a conveyor chain, the pair of further receiving spaces may then each accommodate one of the pair of further coupling pieces of an adjacent chain link on the one long side of the conveying body. Such arrangement may have a total of five coupling pieces to form a double hinge configuration. The invention also provides for a conveyor, comprising a series of hingedly connected chain links, preferably including features as set out above, each chain link comprising a planar elongate sheet metal conveying body having four outer corners and sides that extend between adjacent outer corners, the sides including a pair of opposing long sides, and a pair of opposing short sides that extend between the long sides, the sides further including side face portions that extend substantially transversely to a conveying plane of the conveying body. At each of the outer corners, the conveying body includes a corner face portion that extends transversely to the conveying plane, and that connects angularly to a side face portion of a short side. Alternatively or in addition, wherein one of the sides, in particular a long side, includes a stamped side face portion presenting a stamped structure and at least one of the other sides, in particular a short side, includes a slit side face portion presenting a slit structure.

In the conveyor, one long side of the elongate conveying body of the link may form a leading edge of the link, and the opposite long side may form a trailing edge of the link, while the short sides of the conveying body may form lateral edges of the link. Coupling pieces may extend from the conveying bodies of consecutive links to loop around a receiving space for a hinge pin located below the conveying plane of the conveying body, and coupling pieces of consecutive links may cooperate to form a hinge, and may be connected by means of a hinge pin extending through the receiving space.

The invention further provides for a blank for a chain module, in particular for a chain module including features as discussed above, comprising a planar elongate sheet metal conveying body having four outer corners and sides that extend between adjacent outer corners, the sides including a pair of opposing long sides, and a pair of opposing short sides that extend between the long sides, the sides including side face portions that extend substantially transversely to a conveying plane of the conveying body, and wherein at each of the outer corners, the conveying body includes a corner face portion that extends transversely to the conveying plane, further comprise planar tongues extending from long sides of the conveying body along a conveying plane of the body. At each of the outer corners, the conveying body may include a corner face portion that extends transversely to the conveying plane, and that connects angularly to a side face portion of a short side. Alternatively or in addition, one of the sides, in particular a long side, may include a stamped side face portion presenting a stamped structure and at least one of the other sides, in particular a short side, may include a slit side face portion presenting a slit structure.

One tongue may be centrally located on one long side of the elongate conveying body and two interspaced tongues are placed on an opposite long side, and the tongues may be arranged such that the centrally located tongue on one long side of the conveying body corresponds with the interspace between the interspaced tongues on the opposite long side of the conveying body.

The invention further provides for a method of manufacturing a blank for a chain link for a conveyor chain, in particular a blank including features as discussed above, wherein the blank is punched from a strip of sheet metal by stamping the sheet metal through a die with a punch tool, and wherein the punch tool is arranged to overlap a longitudinal side of the strip of sheet metal to form a long side face of a conveying body of the blank that extends transversely to the longitudinal side of the strip, so that a portion of the side face of the longitudinal side of the strip forms a short side face of the conveying body of the blank, and a corner face portion of the conveying body of the blank connects angularly with the short side face portion at a peripheral corner of the conveying body of the blank that is formed.

Opposing longitudinal side faces of the strip may form opposing short side faces of the conveying body of the blank, and the width of the conveying body of the blank equals the width of the strip. This allows for both highly efficient use of material and ease of manufacture.

Opposing longitudinal edges of the strip may form slit side face portions that present a slit structure, so that a short side face of the conveying body of the blank presents a slit structure, and a long side face of the conveying body of the blank presents a stamped structure.

The invention furthermore provides for a method of manufacturing a blank for a chain link for a conveyor chain, optionally including features of the method as discussed above, and in particular a blank including features as discussed above, wherein the blank is punched from a strip of sheet metal by stamping sheet metal through a die with a punch tool to form a long side face of a conveying body of the blank that extends transversely to the longitudinal side of the strip, so that a portion of the longitudinal side of the strip forms a short side face of the conveying body of the blank. The short side face may be left as it is, in particular presenting a slit structure.

For punching subsequent blanks, the punch tool may be indexed along the length of strip over a distance that corresponds to the length of the blank to be stamped. By punching the blanks back to back, efficiency of material use may be increased further. To facilitate punching the blanks back to back, the tongues may be punched to include convex indentations in their side faces at the tip. This allows a radiused punch tool to be used to stamp out the contour where the conveying body connects to the tongue. As the tongues are curled to form the connecting pieces, the shape of the end of the tongues is not important for the functioning of the chain link.

After stamping, and preferably before curling the strips into connecting pieces, the blank may be coined as discussed above.

The invention will further be elucidated on the basis of exemplary embodiments which are represented in the drawings. The exemplary embodiments are given by way of non-limitative illustration of the invention.

In the drawings:

Prior art FIG. 1*a* shows a schematic top view of two consecutive links of a conveyor chain in accordance with the prior art;

Prior art FIG. 1*b* shows a schematic side view of the two consecutive links of the conveyor chain of FIG. 1*b;*

Prior art FIG. 2 shows a schematic top view of a section of a strip of sheet metal with nested blanks in accordance with the prior art;

Figure 7:
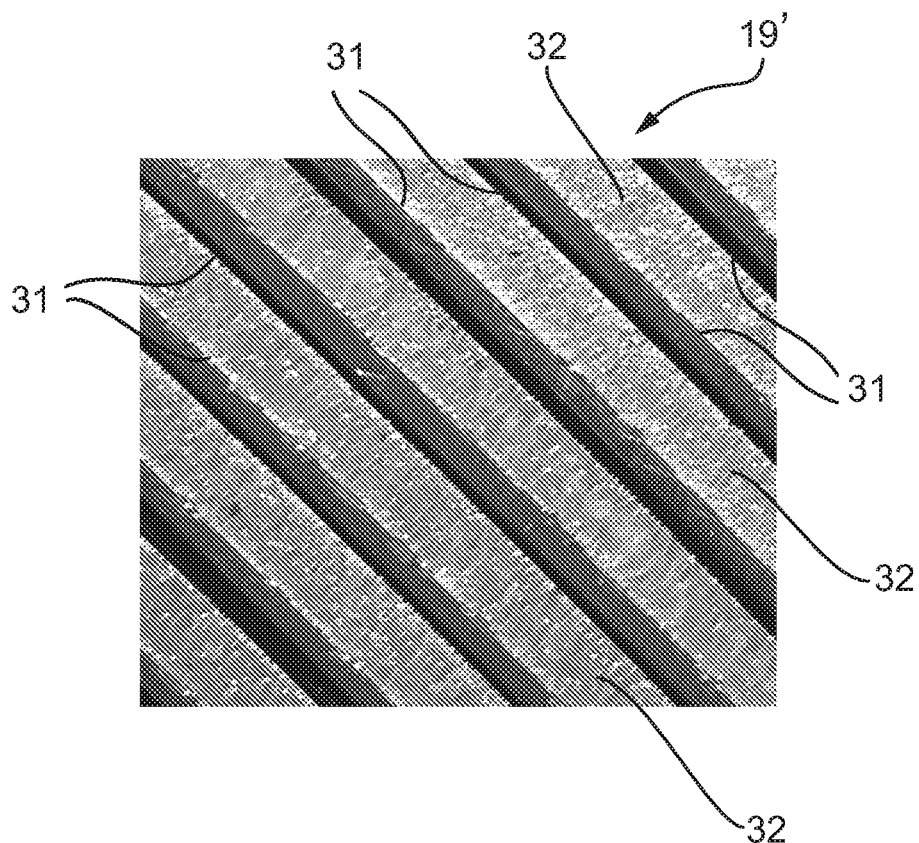
Figure 8:
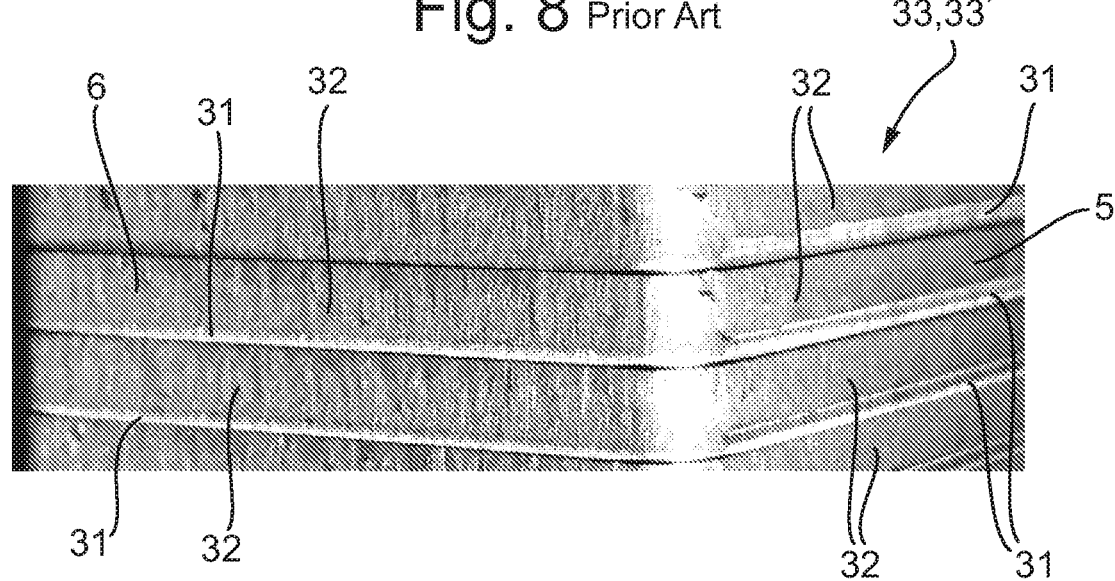

Prior art FIG. 7 shows a perspective side view of a slit face structure of a strip of sheet metal; and Prior art FIG. 8 shows a perspective side view of a stamped face structure of a stack of sections punched from a strip of sheet metal.

It is noted that the figures are only schematic representations that are given by way of non-limited example. In the figures, the same or corresponding parts are designated with the same reference numerals.

Figure 1A:
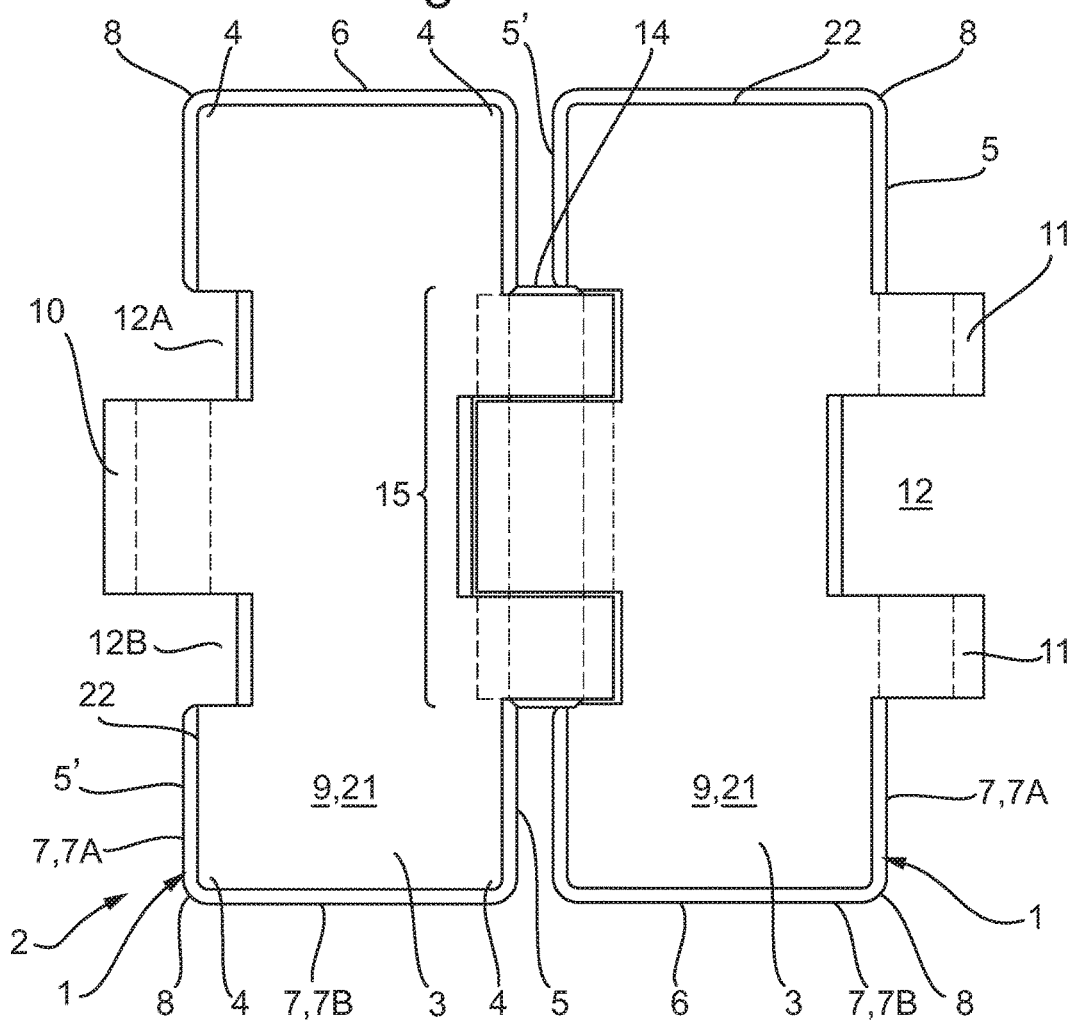
Figure 1B:
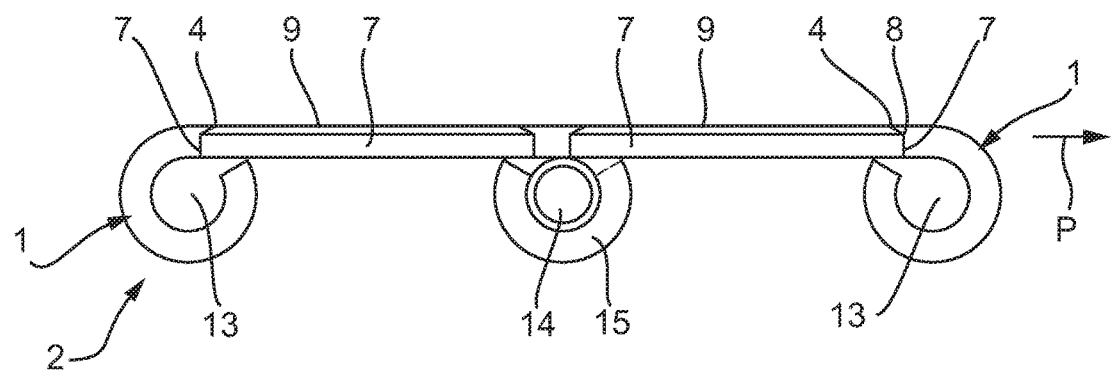
Figure 2:
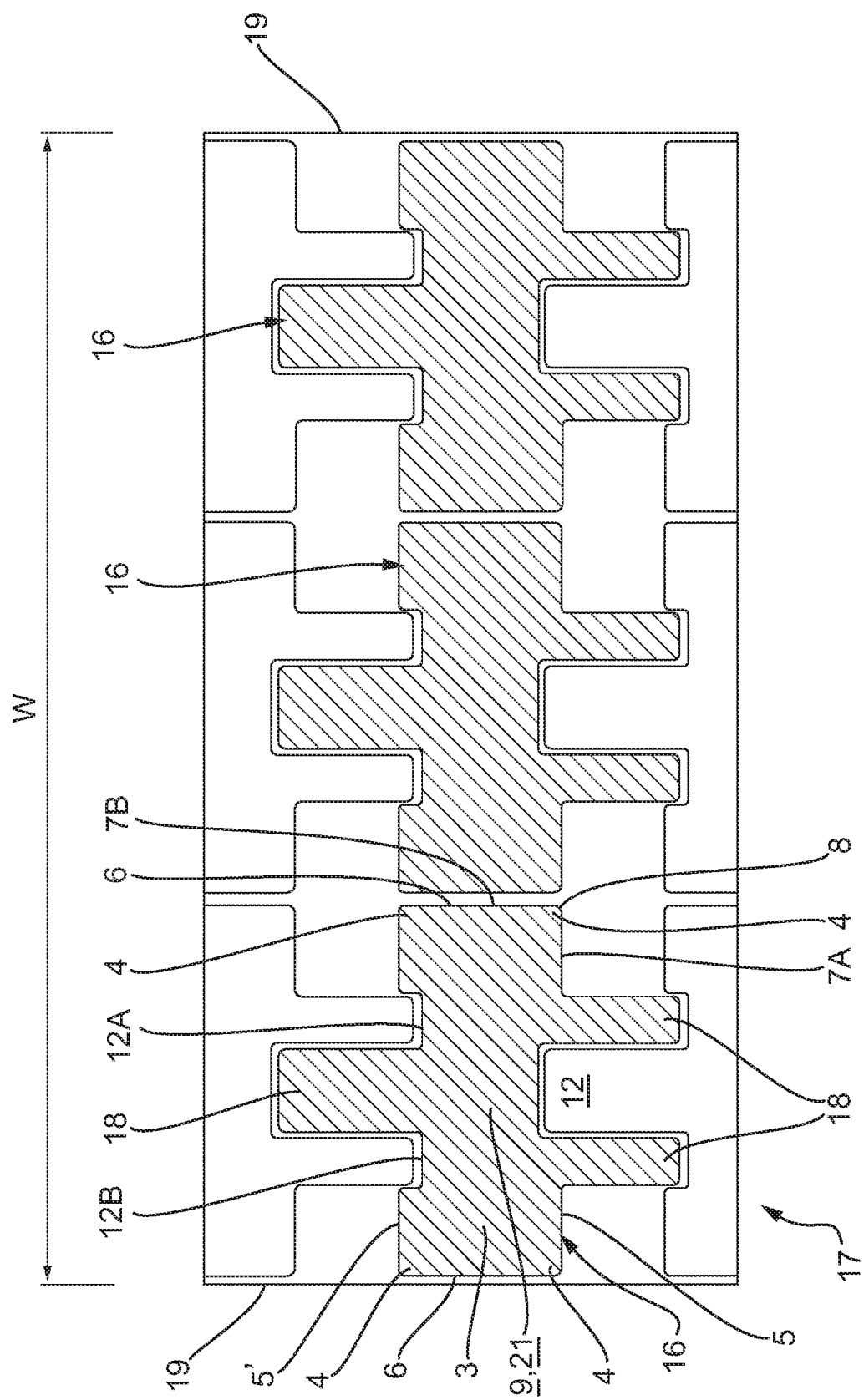
Figure 3:
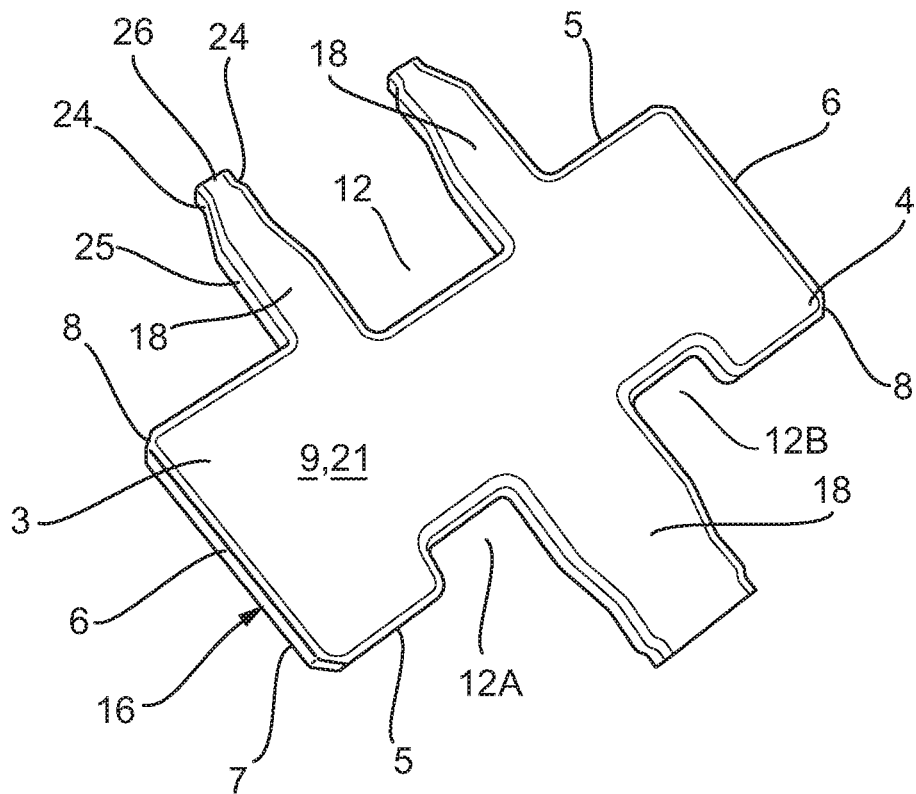
FIG. 3 shows a top perspective view of a blank for a link for a conveyor chain in accordance with the invention.
Figure 4:
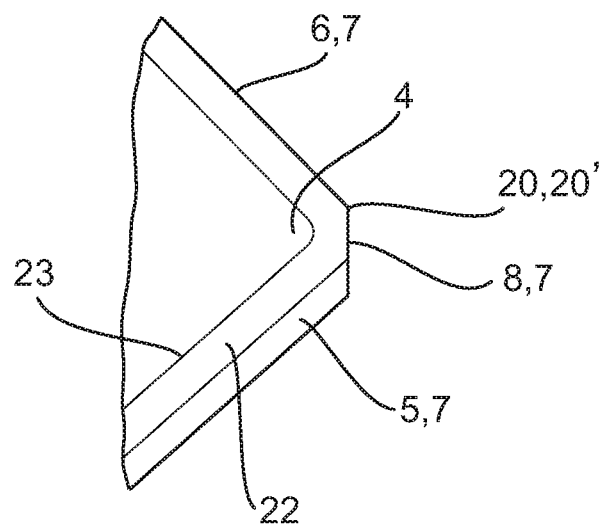
FIG. 4 shows a detail of an outer corner the conveying body blank of FIG. 3.

FIG. 3 shows a blank 16 for a chain link 1 in accordance with the invention. The blank 16 comprises an planar elongate sheet metal conveying body 3 having four outer corners 4 and sides 5,6 that extend between adjacent outer corners 4. The sides 5,6 include a pair of opposing long sides 5, and a pair of opposing short sides 6 that extend between the long sides 5. The sides 5,6 include side face portions 7 that extend substantially transversely to a conveying plane 9 of the conveying body 3. At each of the outer corners 4, the conveying body 3 includes a corner face portion 8 that extends transversely to the conveying plane 9. The conveying body 3 further comprise planar tongues 18 extending from long sides 5 of the conveying body 3 along the conveying plane 9.

One tongue 18 is centrally located on one long side 5 of the elongate conveying body 3 and two interspaced tongues 18 are placed on the opposite long side 5'. The tongues 18 are arranged such that the centrally located tongue 18 corresponds with an interspace 12 between the interspaced tongues 18 on the opposite long side 5 of the conveying body 3. A pair of receiving spaces 12A, 12B is provided adjacent the centrally located coupling piece on the one long side 5 of the conveying body 3 that correspond to the interspaced tongues 18 on the opposite long side of conveying body 3. The conveying surface 9 of the conveying body 3 includes a flat planar transport surface 21 that in use is in contact with products to be conveyed. At each of the outer corners 4, the conveying body 3 includes a corner face portion 8 that extends transversely to the conveying plane 9.

In accordance with the invention, the corner face portion 8 connects angularly to a portion of the side face 7 of a short side 6. The angle of connection a between the side face portion and the corner face portion as measured over the conveying body is in this exemplary embodiment 150°. An angle of intersection 8 between the tangent to the side face portion 7 and the tangent to the corner face portion 8 measured along the conveying body 3 is in this exemplary embodiment 30°. The corner face portion 8 may include a sharp-cornered connection 20' to the side face portion of the short and/or long side. The corner face portion 8 connects to the side face portion 7 via a flat planar connection face 20, and forms a straight connection instead of a curved connection as in the prior art. Due to the angled connection of the corner face portion 8, the peripheral side edge includes a sharp, kinked transitions at the outer corners 4.

The conveying plane 9 is bounded by a coined top section 22 of the peripheral edge of the conveying body 3. The coined top section 22 forms a smooth transition between a peripheral boundary of the flat planar transport surface 21 and the side face portions 7 and corner face portions 8 of the peripheral edge of the conveying body 3. The coined top section 22 defines a peripheral boundary line 23 of the flat planar transport surface 21. At a corner face portion 8 that connects angularly to a side face portion 7 of a short side 6, the coined top section 22 defines boundary line portions 27 of the peripheral boundary line 23 that connect tangentially via a rounded connection. In this example, the corner face portion 8 itself is flat. This way, the flat planar transport surface 21 is shaped exactly as in the prior art, while at the outer corners 4 the peripheral side edge 7 includes sharp, kinked transitions instead of a smooth, rounded transitions at the outer corners. These kinked transitions at the corner face portions 8 of the conveying body 3 do not negatively influence the chain's performance during use. Yet, as shall be explained below, this allows for manufacture with significantly increased material efficiency.

Figure 6:
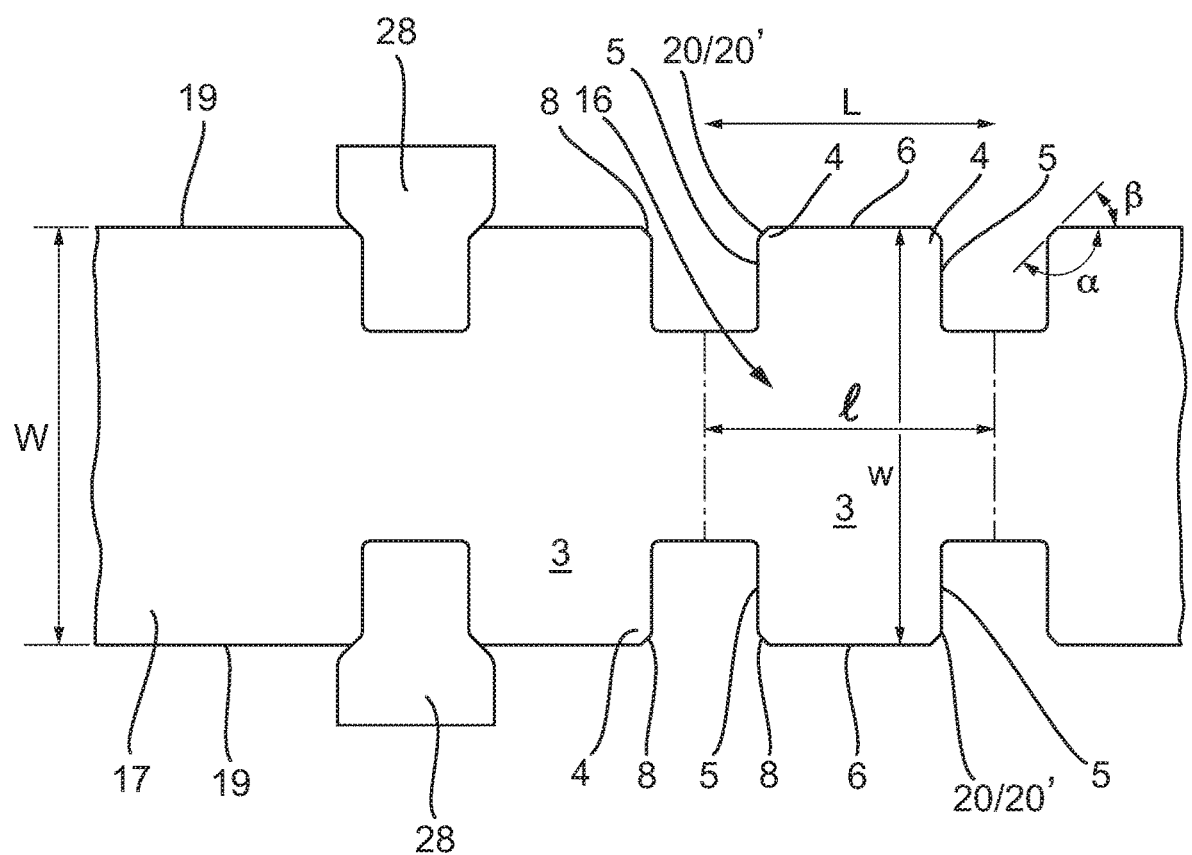
FIG. 6 shows a simplified schematic top view of a section of sheet metal being punched by a punch.

In manufacture, the blank 16 is punched from a strip 17 of sheet metal by stamping the sheet metal through a die with a punch tool 28 (see FIG. 6). The strip 17 has two longitudinal edges 19 spaced at a width W, and has been obtained from a wider coil of steel sheeting in a so called slitting process. The punch tool 28 is arranged to overlap a longitudinal side 19 of the strip 17 of sheet metal to form a stamped side face portion 33 of the side face 7 of long side 5 of the conveying body 3 of the blank 16. This stamped side face portion of the side face 7 extends transversely to the longitudinal edge 19 of the strip 17. The stamped side face portion presents a stamped face structure similar to the one shown in Prior art FIG. 8.

A portion of the side face 7 of the longitudinal side 19 of the strip 17 is punched out of the strip, and a remaining portion of the side face of the longitudinal side 19 of the strip 17 that is left between subsequent punched out portions when the punch tool 28 is indexed over a length L forms a short side 6 of the conveying body 3 of the blank 16. Due to the longitudinal edge 19 of the strip 17 presenting a slit structure, the short side 6 of the conveying body 3 also includes a slit side face portion of the side face 7 that presents a slit structure similar to the one shown in Prior art FIG. 7. Due to the overlap of the punch tool, a corner face portion 8 of the conveying body 3 of the blank 16 is formed that connects angularly with the portion of side face 7 of the short side face 6 at the peripheral corner 4 of the conveying body 3 of the blank 16 that is formed.

Opposing longitudinal sides 19 of the strip 17 form opposing short sides 6 of the conveying body 3 of the blank 16, and the width w of the conveying body 3 of the blank 16 equals the width W of the strip 17. By allowing the corner face portion 8 to connect at an angle α to the side face portion 7, the need for a clamping zone in the sheet of metal along the short side 6 of the blank 16 has been be dispensed with.

Figure 5:
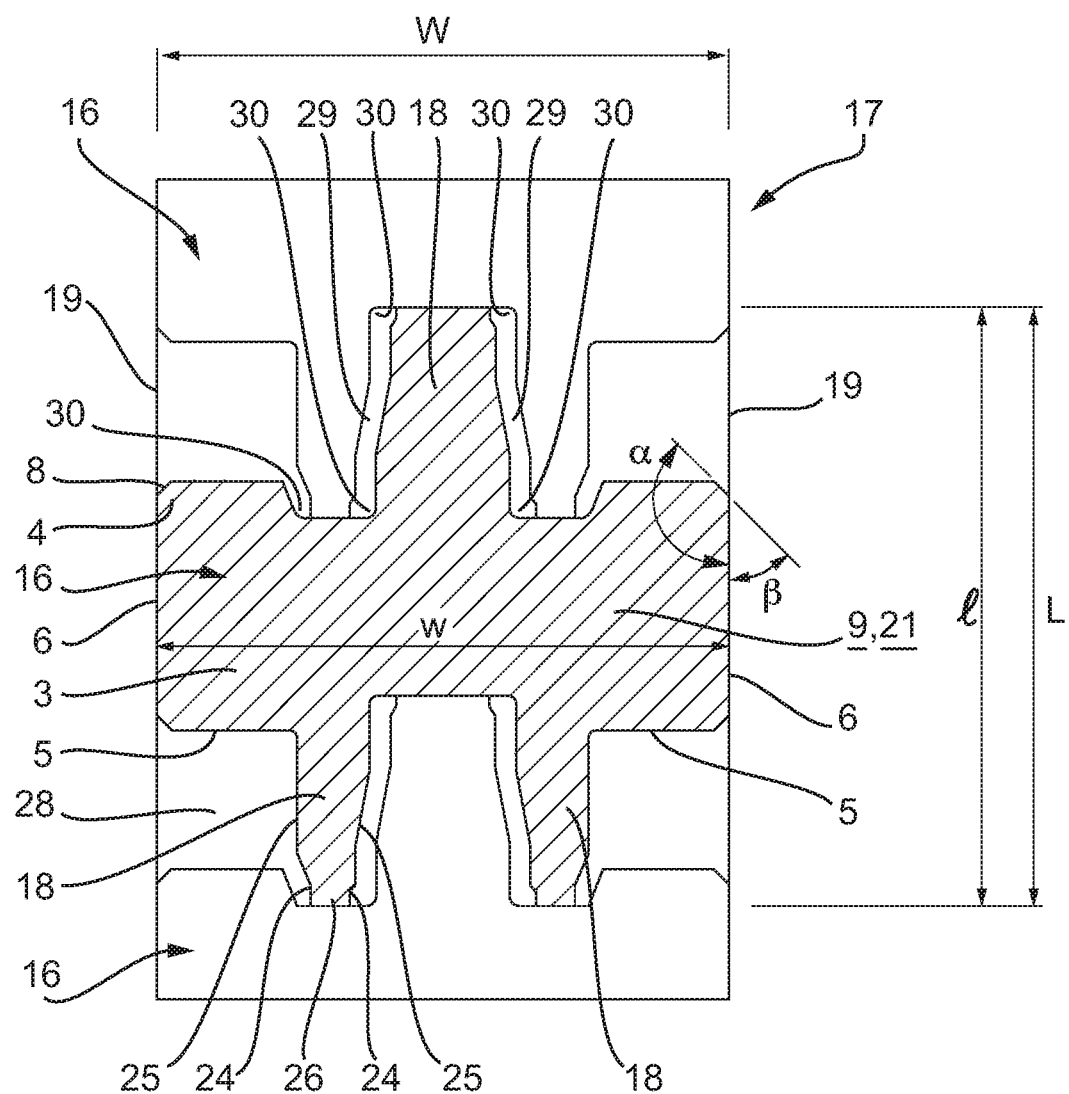
FIG. 5 shows a schematic top view of a section of a strip of sheet metal with nested blanks in accordance with the invention.

The distance L over which the punch tool 28 is indexed along the length of strip 17 corresponds to the length 1 of the blank to be stamped. By punching the blanks back to back this way, efficiency of material use may be increased further. To facilitate punching the blanks 16 back to back, as shown in FIG. 5, the tongues 18 may be punched to include convex indentations 24 in their side faces 25 at the tip 26 of the tongue 18. For this, the punch tool 28 and a further punch tool 29 may be used that have radiused portions 30 to stamp out the contour where the conveying bodies 3 and the tongues 18 of subsequent blanks 16 to be formed connect. The further punch tool 29 may in particular be used to punch out a slot in between the centrally located and interspaced tongues 18. As the tongues 18 are curled to form the coupling pieces 10, 11 the shape of the end of the tongues 18 is not important for the functioning of the chain link 1. Subsequent blanks 16 are then cut free by straight cutting of the connections between the tongues 18 and conveying bodies 3 of subsequent chain link blanks 16.

After stamping, and preferably before curling the strips 17 into coupling pieces to form chain links 1, the blank 16 is pressed between dies to be coined in the form as discussed above. Coining also ensures that the length 1 and width w of the long 5 and short sides 6 of the flat planar transport surface 21 are calibrated, and that the shape of the flat planar transport surface 21 of the conveying body 3 of the chain link 1 to be formed is substantially rectangular, and substantially identical between subsequent chain links 1. By curling the tongues 18 into coupling pieces, the blank 16 shown in FIG. 3 is formed into a chain link 1 that is compliant with DIN 8153/ISO 4348.

After stamping and/or curling the strips 17 into coupling pieces to form the chain links 1, the blank 16 may be subjected to finishing processes, in particular to smoothen out the corner face portion 8 that connects angularly to the side face portions 7 of the short side 6. Thus, the corner face portions 8 may undergo finishing processes such that the transition between the corner face portion 8 and the side face portion 7 may become less sharp. However, the corner face portion 8 that connects angularly to the side face portion 7 can be left as is. By curling the tongues 18 into coupling pieces, the blank 16 shown in FIG. 3 is formed into a chain link 1 including sharp-cornered connections 20' that is compliant with DIN 8153/ISO 4348.

To form a conveyor chain 2, the centrally located 10 coupling piece and the interspaced coupling pieces 11 of consecutive chain links 1 are arranged to cooperate to form a hinge 15, and are connected by means of a hinge pin 14 extending through the receiving space 13. In a conveyor chain 2, the receiving spaces 18A, 18B each accommodate one of the pair of interspaced coupling pieces 11 of an adjacent chain link on one long side 5 of the conveying body 3, and the interspace 12 accommodates the centrally located coupling piece 11 of another adjacent chain link on the opposite long side 5' of the conveying body.

In use in a conveyor 2, one long side 5 of the elongate conveying body 3 of the link 1 forms a leading edge of the link 1 in a conveying direction P, and the opposite long side 5' forms a trailing edge of the link 1, while the short sides 6 of the conveying body 3 form lateral edges of the link 1.

Thus is described a chain link for a conveyor chain, comprising a planar elongate sheet metal conveying body having four outer corners and sides that extend between adjacent outer corners, the sides including a pair of opposing long sides, and a pair of opposing short sides that extend between the long sides, the sides further including side face portions that extend substantially transversely to a conveying plane of the conveying body, and wherein at each of the outer corners, the conveying body includes a corner face portion that extends transversely to the conveying plane. The corner face portion may connect angularly to a side face portion of a short side. The corner face portion may include a sharp-cornered, angular, kinked, and/or flattened connection to a side face portion of a short side.

Many variations will be apparent to the skilled person in the art. For example, the conveying body may include additional coupling pieces to form a double hinge chain, the length to width ratio of the conveying body may vary, and the side faces may be slanted and the coupling pieces may be elongated to allow side flexing of the conveyor chain. The link may be made out of many types of metal, in particular stainless steel. Suitable steel types are e.g. ferritic-pearlitic stainless steels having Werkstoff (material) number 1.4589, 1.4016 or 1.4017.

The conveying body 3 may in an embodiment that is not depicted further additionally comprise a further pair of coupling pieces on either side of the centrally located coupling piece on the one long side 5 of the conveying body 3, each adjacent to a receiving space 12A, 12B. A pair of further receiving spaces may then be provided on the opposite long side 5' of the conveying body that correspond to the pair of further coupling pieces on the one long side 5 of the conveying body 3, each adjacent to one of the pair of coupling pieces 11. In a conveyor chain 2, the pair of further receiving spaces may then each accommodate one of the pair of further coupling pieces of an adjacent chain link on the one long side of the conveying body. Such arrangement may have a total of five coupling pieces to form a double hinge configuration.

The chain links may be in full compliance with DIN 8153/ISO 4348, but may also not or only partially be in compliance.

Such variations are understood to be comprised within the scope of the invention as defined in the appended claims.

LIST OF REFERENCE NUMERALS 1 chain link
2 conveyor chain
3 conveying body
4 outer corner
5 long side
6 short side
7 side face
8 corner face portion
9 conveying plane
10 centrally located coupling piece
11 interspaced coupling pieces
12 interspace
13 receiving space
14 hinge pin
15 hinge
16 blank
17 strip
18 tongue
19 longitudinal edge
19' slit structure
20 flat planar connection face
20' sharp-cornered connection
21 flat planar transport surface
22 coined top section
23 boundary line
24 indentations
25 side face of tongue
26 tip of tongue
27 boundary line portion
28 punch tool
29 further punch tool
30 radiused portions
31 shiny zone
32 dull fracture zone
33 stamped side face portion
33' stamped structure
α angle of connection
ß angle of intersection
P conveying direction
W width of strip
w width of conveying body
L indexing length
l length of conveying body

The invention claimed is:

1. A chain link for a conveyor chain, comprising a planar elongate sheet metal conveying body having four outer corners and sides that extend between adjacent outer corners, the sides including a pair of opposing long sides and a pair of opposing short sides that extend between the long sides, the sides further including side face portions that extend substantially transversely to a conveying plane of the conveying body, and wherein at each of the outer corners, the conveying body includes a corner face portion that extends transversely to the conveying plane and that connects angularly to a side face portion of a short side.

2. The chain link according to claim 1, wherein at least one of the long sides includes a stamped side face portion presenting a stamped structure and wherein further at least one of the short sides includes a slit side face portion presenting a slit structure.

3. The chain link according to claim 1, wherein the corner face portion of the conveying body includes a sharp-cornered connection to the side face portion.

4. The chain link according to claim 1, wherein the corner face portion of the conveying body connects to the side face portion via a flat planar connection face.

5. The chain link according to claim 1, wherein an angle of connection between the corner face portion and the side face portion measured over the conveying body is between 175° and 90°, in particular between 150° and 100°, and in particular is about 120°.

6. The chain link according to claim 1, wherein the conveying plane includes a flat planar transport surface.

7. The chain link according to claim 6, wherein the conveying plane is bounded by a coined top section of a peripheral edge of the conveying body that forms a smooth transition between a peripheral boundary of a flat planar transport surface and the side face portions and the corner face portions of the peripheral edge of the conveying body.

8. The chain link according to claim 7, wherein the coined top section defines a peripheral boundary line of the flat planar transport surface.

9. The chain link according to claim 8, wherein at the corner face portion that connects angularly to the side face portion of the short side, the coined top section defines line portions of the peripheral boundary line that connect tangentially via a rounded connection.

10. The chain link according to claim 1, wherein the conveying body has a centrally located coupling piece on one long side thereof and a pair of interspaced coupling pieces on the opposite long side thereof, and wherein the coupling pieces are arranged such that the centrally located coupling piece on the one long side of the conveying body corresponds with an interspace between the interspaced coupling pieces on the opposite long side of the conveying body.

11. The chain link according to claim 10, wherein the coupling pieces extend from the conveying body to loop around a receiving space for a hinge pin located below the conveying plane of the conveying body.

12. A conveyor, comprising a series of hingedly connected chain links, each chain link comprising a planar elongate sheet metal conveying body having four outer corners and sides that extend between adjacent outer corners, the sides including a pair of opposing long sides and a pair of opposing short sides that extend between the long sides, the sides further including side face portions that extend substantially transversely to a conveying plane of the conveying body,
wherein at each of the outer corners, the conveying body includes a corner face portion that extends transversely to the conveying plane, and that connects angularly to a side face portion of a short side.

13. The conveyor of claim 12, wherein one long side of the pair of opposing long sides of the elongate conveying body of the link forms a leading edge of the link, and an opposite long side of the pair of opposing long sides forms a trailing edge of the link, while the pair of opposing short sides of the conveying body form lateral edges of the link.

14. The conveyor of claim 12, wherein coupling pieces extend from the conveying bodies of consecutive links to loop around a receiving space for a hinge pin located below the conveying plane of the conveying body, and wherein coupling pieces of consecutive links cooperate to form a hinge, and are connected by means of a hinge pin extending through the receiving space.

15. A blank for a chain link, comprising a planar elongate sheet metal conveying body having four outer corners and sides that extend between adjacent outer corners, the sides including a pair of opposing long sides and a pair of opposing short sides that extend between the long sides, the sides including side face portions that extend substantially transversely to a conveying plane of the conveying body, further comprising planar tongues extending from the long sides of the conveying body along a conveying plane of the body, and
wherein at each of the outer corners, the conveying body includes a corner face portion that extends transversely to the conveying plane, and that connects angularly to the side face portion of the short side.

16. The blank according to claim 15, wherein one tongue of the tongues is centrally located on one long side of the pair of opposing long sides of the elongate conveying body and two interspaced tongues of the tongues are placed on an opposite long side of the pair of opposing long sides, and wherein the tongues are arranged such that the centrally located tongue on the one long side of the conveying body corresponds with an interspace between the interspaced tongues on the opposite long side of the conveying body.

17. Method of manufacturing a blank for a chain link for a conveyor chain,
wherein the blank is punched from a strip of sheet metal by stamping sheet metal through a die with a punch tool, and
wherein the punch tool is arranged to overlap a longitudinal side of the strip of sheet metal to form a long side face of a conveying body of the blank that extends transversely to the longitudinal side of the strip, so that a portion of the side face of the longitudinal side of the strip forms a short side face of the conveying body of the blank, and a corner face portion of the conveying body of the blank connects angularly with the short side face portion at a peripheral corner of the conveying body of the blank that is formed.

18. The method of claim 17, wherein the blank is punched from the strip of sheet metal by stamping sheet metal through a die with a punch tool to form a long side face of the conveying body of the blank that extends transversely to the longitudinal side of the strip, so that a portion of the longitudinal side of the strip forms a short side face of the conveying body of the blank.

19. The method of claim 17, wherein the short side face is left as it is, in particular presenting a slit structure.

20. The method of claim 17, wherein opposing longitudinal side faces of the strip form opposing short side faces of the conveying body of the blank, and
wherein the width of the conveying body of the blank equals the width of the strip.

21. The method of claim 17, wherein opposing longitudinal edges of the strip form slit side face portions that present a slit structure, so that the short side face of the conveying body of the blank presents a slit structure, and the long side face of the conveying body of the blank presents a stamped structure.

22. The method of claim 17, wherein for punching subsequent blanks, the punch tool is indexed along a length of the strip over a distance that corresponds to a length of the blank to be stamped.

23. The method of claim 17, wherein the blank is coined at the peripheral corner of the conveying body.

24. The chain link according to claim 1, wherein the corner face portion of the conveying body connects to the side face portion via a flat planar connection face, wherein the conveying plane is bounded by a coined top section of a peripheral edge of the conveying body that forms a smooth transition between a peripheral boundary of a flat planar transport surface and the side face portions and the corner face portions of the peripheral edge of the conveying body, and wherein the coined top section defines a peripheral boundary line of the flat planar transport surface.

25. The conveyor of claim 12, wherein at least one of the long sides includes a stamped side face portion presenting a stamped structure and at least one of the short sides includes a slit side face portion presenting a slit structure.

26. The blank according to claim 15, wherein at least one of the long sides includes a stamped side face portion presenting a stamped structure and wherein further at least one of the short sides includes a slit side face portion presenting a slit structure.

27. The blank according to claim 26, wherein one tongue of the tongues is centrally located on one long side of the pair of opposing long sides of the elongate conveying body and two interspaced tongues of the tongues are placed on an opposite long side of the pair of opposing long sides, and wherein the tongues are arranged such that the centrally located tongue on the one long side of the conveying body corresponds with an interspace between the interspaced tongues on the opposite long side of the conveying body.

* * * * *